United States Patent [19]

Yasue et al.

[11] Patent Number: 4,825,372

[45] Date of Patent: Apr. 25, 1989

[54] SYSTEM FOR INTEGRALLY CONTROLLING AUTOMATIC TRANSMISSION AND ENGINE

[75] Inventors: Hideki Yasue; Kagenori Fukumura, both of Toyota, Japan

[73] Assignee: Toyota Jidosha Kabushiki Kaisha, Aichi, Japan

[21] Appl. No.: 12,165

[22] Filed: Feb. 9, 1987

[30] Foreign Application Priority Data

Feb. 14, 1986 [JP] Japan .................................. 61-30292

[51] Int. Cl.$^4$ ...................... G05D 17/02; G06F 15/50
[52] U.S. Cl. ............................... 364/431.01; 74/866; 364/424.1
[58] Field of Search ........................ 364/424.1, 431.07; 74/861, 866, 867; 123/435

[56] References Cited

U.S. PATENT DOCUMENTS

| | | | |
|---|---|---|---|
| 4,208,929 | 6/1980 | Heino et al. | 74/866 |
| 4,262,335 | 4/1981 | Ahlen | 74/866 |
| 4,266,447 | 5/1981 | Heess et al. | 74/866 |
| 4,370,903 | 2/1983 | Stroh et al. | 74/866 |
| 4,403,527 | 9/1983 | Mohl et al. | 74/866 |
| 4,523,281 | 6/1985 | Noda et al. | 364/424.1 |
| 4,543,934 | 10/1985 | Morita et al. | 123/435 |
| 4,556,942 | 12/1985 | Russo et al. | 364/431.07 |
| 4,604,700 | 8/1986 | Igarashi et al. | 364/424 |
| 4,643,048 | 2/1987 | Hattori et al. | 74/866 |
| 4,688,450 | 8/1987 | Hayashi et al. | 74/866 |
| 4,690,017 | 9/1987 | Taniguchi et al. | 74/866 |
| 4,703,428 | 10/1987 | Hosaka et al. | 364/424.1 |

Primary Examiner—Felix D. Gruber
Attorney, Agent, or Firm—Oliff & Berridge

[57] ABSTRACT

In a system for integrally controlling an automatic transmission and an engine, wherein gear stages are automatically switched in accordance with a present shift map and engine torque is changed by a predetermined value by lag angle control to maintain satisfactory the shift characteristics. A change of engine torque is regulated when the frequency of shifts is high. However, the regulation of engine torque change is moderated when the engine is not warmed-up. With this arrangement, temperature in an exhaust system is prevented from becoming abnormally high due to the changes of the engine torque. Furthermore, the engine torque change can be controlled to the maximum when an increase of temperature in the exhaust system does not matter.

12 Claims, 8 Drawing Sheets

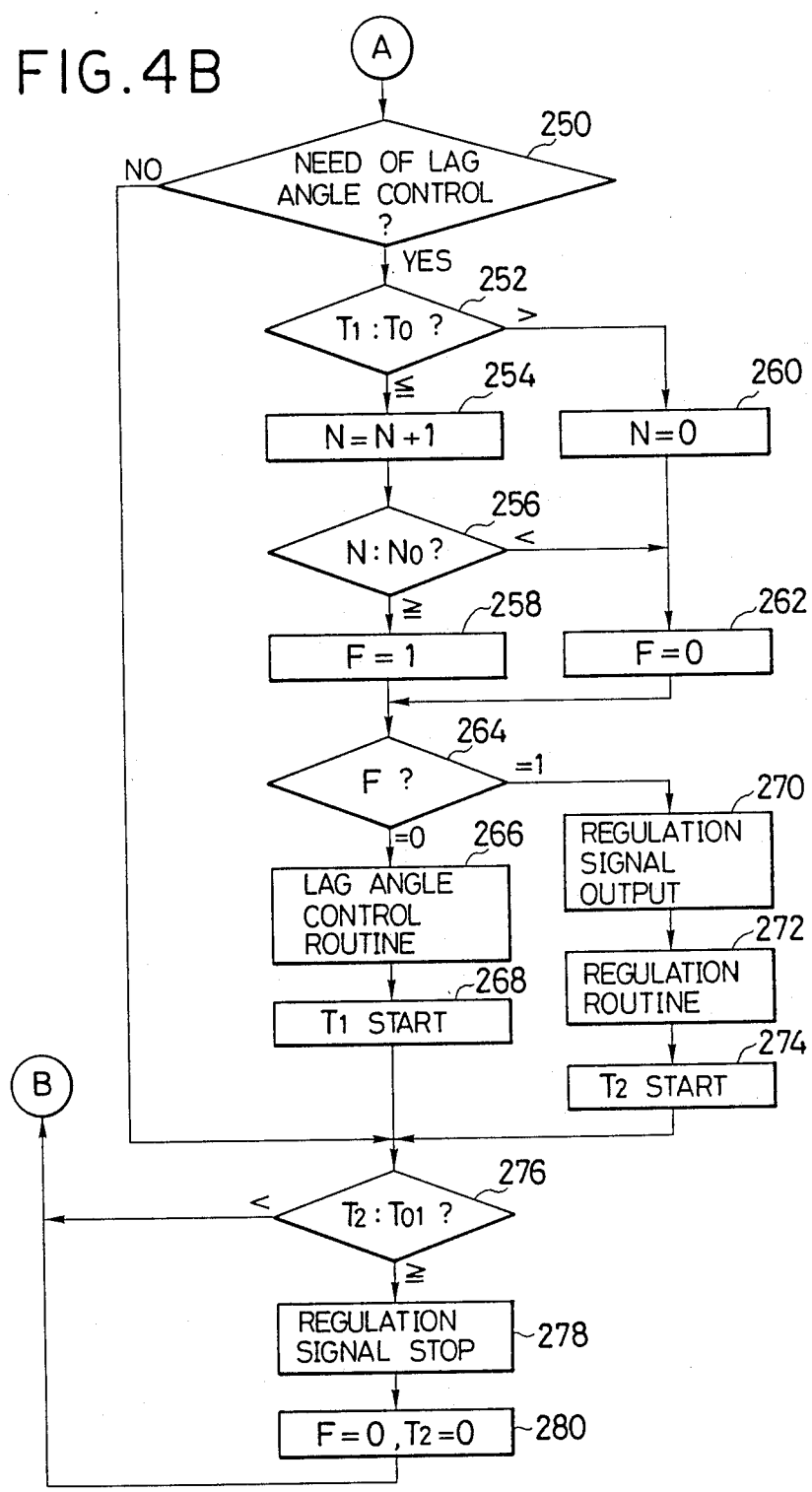

FIG. 7
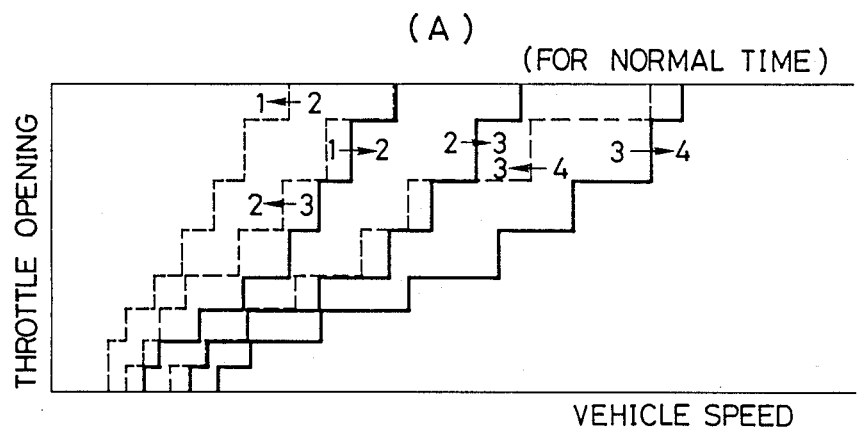
(A) (FOR NORMAL TIME)
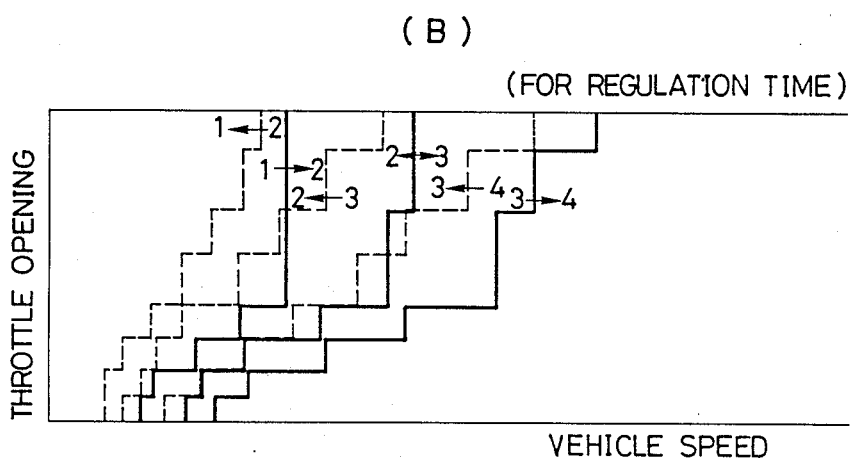
(B) (FOR REGULATION TIME)

SYSTEM FOR INTEGRALLY CONTROLLING AUTOMATIC TRANSMISSION AND ENGINE

BACKGROUND OF THE INVENTION

This invention relates to a system for integrally controlling an automatic transmission and an engine. More particularly it relates to improvements in a system for controlling an automatic transmission and an engine, wherein gear stages are automatically switched in accordance with a preset shift map, and engine torque is changed by a predetermined value during shifting to maintain satisfactory shift characteristics.

Automatic transmissions are known to include gear transmission mechanisms, a plurality of frictionally engaging devices, and hydraulic pressure control devices operated to selectively switch the engagements of the frictionally engaging devices, so that any one of a plurality of gear stages can be achieved in accordance with a preset shift map.

Furthermore, in an automatic transmission for a vehicle, of the type described, there have been proposed various systems for integrally controlling an automatic transmission and an engine, wherein, engine torque is changed during shifting to obtain satisfactory shift characteristics and durability of the frictionally engaging devices (For example, Japanese Patent Laid-Open No. 69738/1980 corresponding to U.S. Patent 4,266,447). More specifically, the system for integrally controlling the automatic transmission and the engine, of the type described intends that the amount of torque transmitted from the engine is changed during shifting and the amount of absorbed energy in various members in the automatic transmission or in the frictionally engaging devices for controlling these members is controlled so as to complete a shifting within a short period of time under a low shift shock, whereby a satisfactory shift feeling is given to a driver and durability of the frictionally engaging devices is improved. As a method of changing (decreasing) engine torque, there is a method of delaying ignition timing of the engine (a method of lag angle).

However, when the method of delaying ignition timing is adopted as a measure of changing (decreasing) engine torque for example, the occurrence of so-called after-burn is increased, which is caused by opening an exhaust valve before the gaseous mixture completely burns in the engine cylinders due to the delay of ignition timing. As a result, such a problem is presented that high temperature gas is exhausted into an exhaust pipe, whereby temperature of an exhaust system (exhaust gas temperature, catalyst temperature, exhaust pipe temperature and the like) rises. The rise in the temperature of the exhaust system caused by changes in engine torque during shifting as described above presents no problem, as far as shift frequency during normal running.

However, in the case of running in the mountainous district where the shift frequency is high or in the case where a user intentionally performs on-off operations of an accelerator, the temperature of the exhaust system rises to a tolerance value or more, and, in an extreme case, an adverse influence is rendered to the durability of an exhaust manifold, and further, in an engine system having turbo-charger, there is a possibility of giving an adverse influence to turbine blades on the exhaust side.

As a consequence, there has heretofore been a need to pay attention to avoid the above-described disadvantages, even if shifting is made under the highest frequency, in designing routines relating to engine torque control, in setting a map of an engine torque change value and the like. For example, the smaller the lag angle value of ignition timing, the smaller the increase of the temperature.

However, when a lag angle value of ignition timing is set at a value rather low from the above-described viewpoint for example, a lowered value of engine torque should naturally be decreased, thus presenting such a problem that the proper purpose of control for improving the shift characteristics including durability of the frictionally engaging devices cannot be satisfactorily displayed in normal time.

In view of the above-described conventional problem, the applicant previously proposed systems for integrally controlling an automatic transmission and an engine, wherein, in controlling an engine torque during shifting, when there is possibility of an actual occurrence of the problem, i.e. when a frequency of shifts is high, the shifting is regulated, so that the freedom in setting the torque control are improved and the proper function of the engine torque control can be satisfactorily displayed in normal time (For example, Japanese patent application No. 290017/1985, Application Date: Dec. 23, 1985, and patent application No. 295198/1985, Application Date: Dec. 27, 1985; which corresponds to the U.S. application Ser. No. 945,501 filed Dec. 23, 1986.

However, when these systems are used, such a disadvantage may occur anew that, if a predetermined period of time or a predetermined number of times for determining the frequency of shifts is set at a definite value, then, even when a lag angle control can be performed without causing a trouble in such a case that the engine is relatively cold, the lag angle control is still regulated.

SUMMARY OF THE INVENTION

The present invention has been developed to obviate the above-described disadvantages and has as its object the provision of a system for integrally controlling an automatic transmission and an engine, wherein, while a disadvantage caused due to frequent engine torque controls is avoided by the regulation of the engine torque controls, the regulation is moderated when strong regulation is not required in accordance with the warmed-up state of the engine, so that the proper function of the engine torque control can be displayed to the maximum.

FIG. 1 shows the technical illustration of the present invention. The present invention improves a system for integrally controlling an automatic transmission and an engine, wherein gear stages are automatically switched in accordance with a preset shift map and an engine torque is changed by a predetermined value by a lag angle control, so that the shift characteristics can be maintained satisfactorily. According to the present invention, detection is made as to whether or not the shifts have been frequently carried out, i.e. whether or not, the torque change controls have been frequently performed, and, if the torque change controls have been performed frequently, then the engine torque changes are regulated in principle. More specifically, the present invention can offer the advantages that, in controlling the engine torque during shifting, disadvantages caused by the frequent engine torque controls can be reliably avoided, the freedom in setting the engine torque changes are improved, and the proper function of the engine torque controls can be satisfactorily displayed in normal time.

On the other hand, according to the present invention, the warmed-up state of the engine is detected, and, even if the frequency of torque changes is high, when strong regulation is not required (when the engine is not warmed up), the regulation is moderated. More specifically, even if the engine torque control is frequently performed, if the engine is relatively cold, then the regulation can be moderated in consideration of an increase in temperature of an exhaust system, so that the proper function of the engine torque change control can be displayed to the maximum.

Preferably, the condition of regulation may be changed in accordance with at least one of a vehicle speed, an engine rotary speed and an engine load, in addition to an engine cooling water temperature.

With this arrangement, only the necessary and least regulation can be carried out in accordance with the running conditions of the vehicle.

BRIEF DESCRIPTION OF THE DRAWINGS

The above object, features and advantages of the present invention, as well as other objects and advantages thereof, will become more apparent from the description of the invention which follows, taken into conjunction with the accompanying drawings, wherein like reference characters designate the same or similar parts and wherein:

FIG. 4A and 4B taken together are a flow chart showing an engine control routine;

FIGS. 7 (A) and 7 (B) are charts showing examples of modulations of shift maps.

DESCRIPTION OF THE PREFERRED EMBODIMENTS

The present invention will be described in detail with reference to the accompanying drawings which illustrate preferred embodiments of the present invention.

Figure 1:
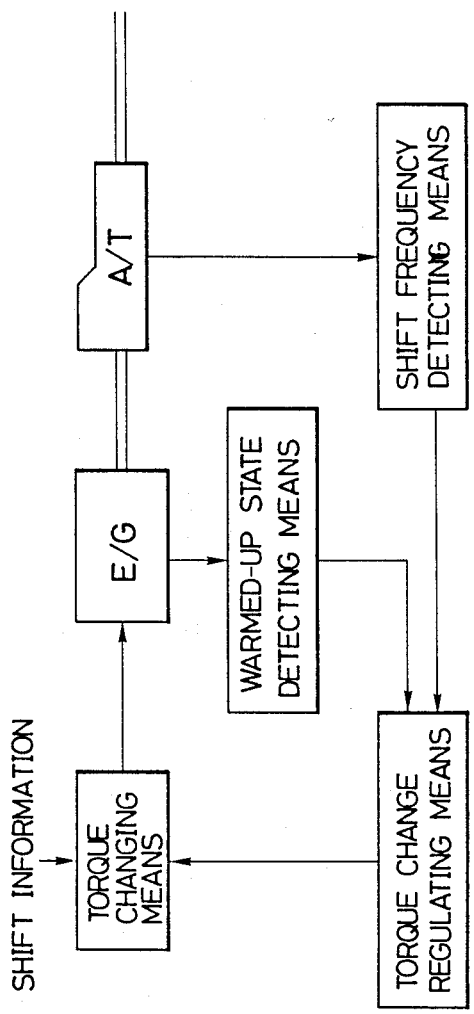
FIG. 1 is a block diagram showing the technical illustration of the present invention.
Figure 2:
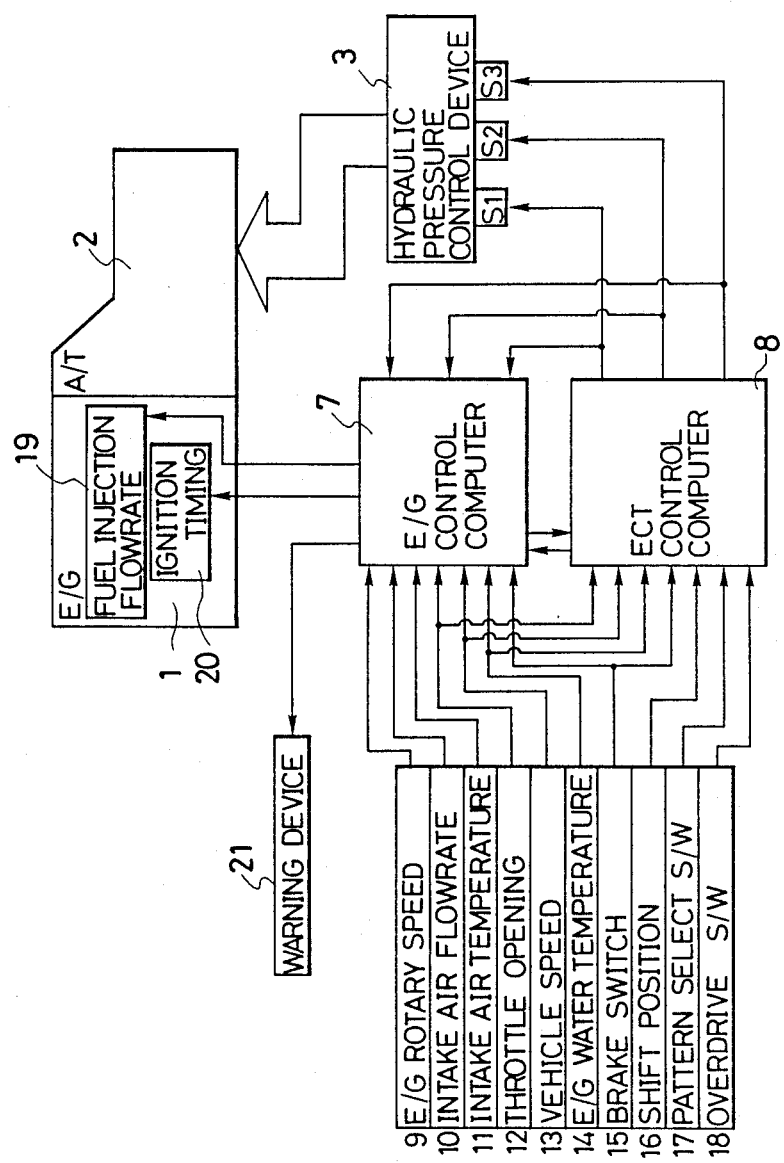
FIG. 2 is a general block diagram showing the embodiment of the system for integrally controlling an automatic transmission and an engine according to the present invention.

FIG. 2 is a block diagram showing the general arrangement of the system for integrally controlling an automatic transmission and an engine, to which the present invention is applied.

An engine 1 and an automatic transmission 2 are well known in the art. In the engine 1, fuel injection flowrate at an injector 19 and an ignition timing at a distributor 20 are controlled by an engine control computer 7, so that engine output in proportion to throttle opening and engine rotary speed can be obtained. In the automatic transmission 2, electromagnetic valves S1–S3 are controlled by an automatic transmission control computer 8, and oil lines in a hydraulic pressure control device are changed whereby the engagements of frictionally engaging devices are selectively changed, so that a gear stage proportional to vehicle speed and accelerator opening can be obtained.

More specifically, the engine control computer 7 receives signals of engine rotary speed from an engine rotary speed sensor (crank angle sensor) 9; intake air flowrate from an air flow meter 10; intake air temperature from an intake air temperature sensor 11; throttle opening from a throttle sensor 12; vehicle speed from a vehicle speed sensor 13; engine water temperature from a water temperature sensor 14; and brake-ON signal from a brake switch 15. The engine control computer 7 determines the fuel injection flowrate and the ignition timing in response to the above-mentioned signals. Furthermore, ON-OFF solenoid signals of the electromagnetic valves S1–S3 controlled by the automatic transmission control computer 8 are inputted in parallel to into this engine control computer 7, whereby shift timing of the automatic transmission is determined.

Automatic transmission control computer 8 receives signals from: the throttle sensor 12; the vehicle speed sensor 13; the water temperature sensor 14; the brake switch 15, and further, signals of: position of a shift lever from a shift position sensor 16; running selection patern such as a fuel consumption mode and a power performance mode from a pattern select switch 17; permission of a shift to overdrive from an overdrive switch 18; whereby the ON-OFF states of electromagnetic valves S1–S3 are controlled, so that a gear stage proportional to the vehicle speed and the accelerator opening can be obtained.

Furthermore, a lag angle control regulation signal is inputted into the automatic transmission control computer 8 from the engine control computer 7, whereby the automatic transmission determines that the engine 1 has regulated the lag angle control.

Figure 3:
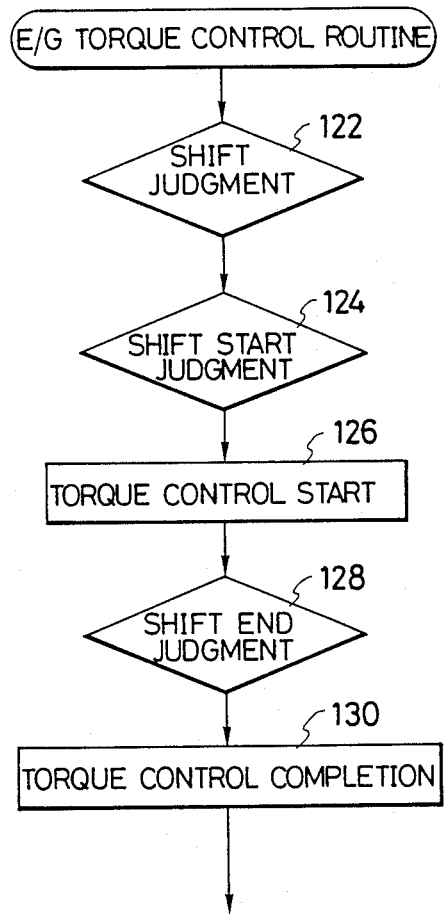
FIG. 3 is a flow chart showing a lag angle control routine adopted in the system of the above embodiment.

FIG. 3 is the flow chart showing the integral control of the engine and the automatic transmission.

In the control routine of the engine control computer 7, it is judged from a change in signals of the electromagnetic valves S1–S3 that a shifting will take place (Step 122), and thereafter, in Step 124, if it is judged that the shifting is actually started when the engine rotary speed is changed (for example, in the case of an up shift, the engine rotary speed is lowered), a lag angle (engine torque down) is started in accordance with a lag angle value predetermined by the type of shifting, the throttle opening and the like (Step 126). As the shifting progresses, the engine rotary speed is changed to a rotary speed which is obtained by adding a predetermined value (including a negative number) to the engine rotary speed at the time of completion of the shifting. The engine rotary speed at the time of completion of the shifting is searched from an output shaft rotary speed and a gear ratio. Then, completion of the shifting is judged (Step 128), thereafter, a lag angle is changed relatively slowly, taking a predetermined period of time (Step 130), and the normal ignition timing is restored.

Figure 4A:
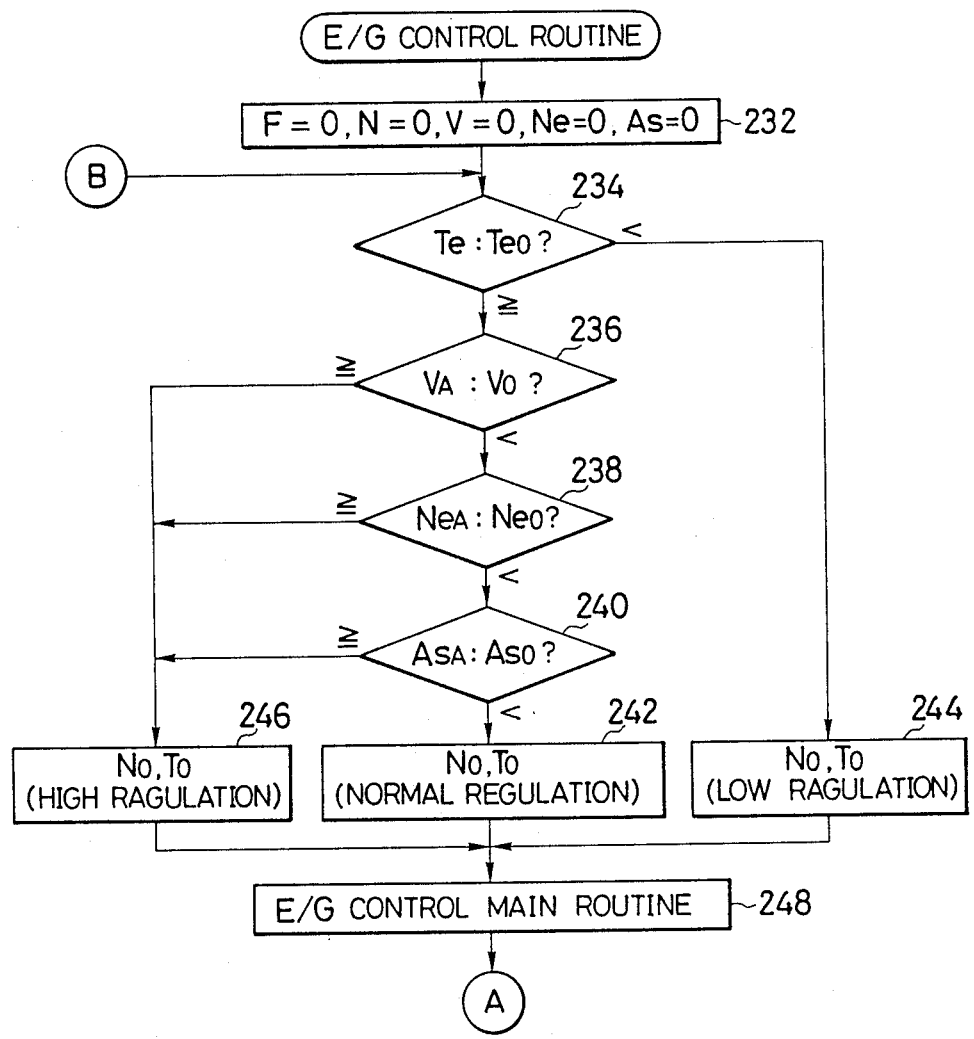
Figure 5:
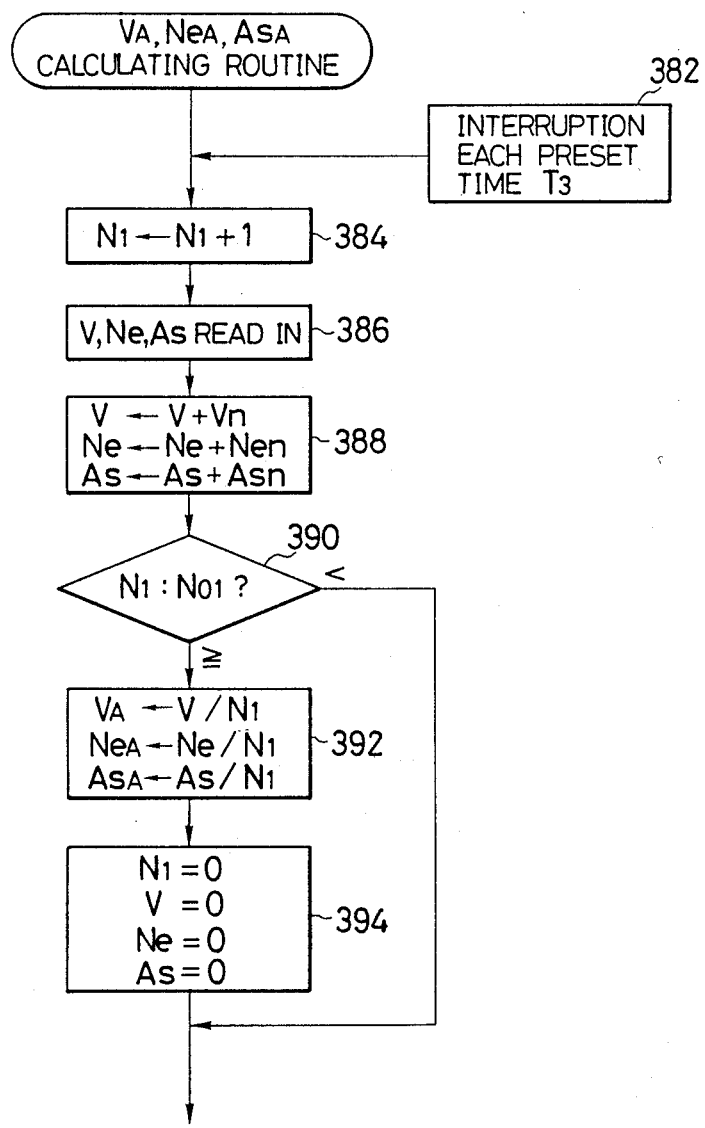
FIG. 5 is a flow chart showing an interrupt routine for searching a mean vehicle speed, a mean engine rotary speed and a mean throttle opening.

Detailed description will hereunder be given of the above control with reference to FIGS. 4 and 5.

FIG. 4 is the flow chart showing the engine control routine.

As the initialization, flag F, counter N, vehicle speed V, engine rotary speed Ne and throttle opening As are reset (Step 232). Here, flag F indicates a period of time, during which the lag angle control is regulated, and counter N indicates the number of times of lag angle controls. Subsequently, Te for judging the warmed-up state of the engine (engine cooling water temperature, engine oil temperature for example) and a predetermined value TeO are compared with each other (Step 234). When Te< TeO, i.e. the engine is not warmed up, counter value NO and time value TO during low regulation are selected (Step 244). When Te≧ TeO, and when mean vehicle speed VA is less than predetermined value VO (Step 236), mean engine rotary speed NeA is less than predetermined value NeO (Step 238), and mean throttle opening AsA is less than a predetermined value AsO (Step 240), NO and TO during normal regulation are selected (Step 242). Furthermore, when any one of the above parameters is larger than the corresponding predetermined values, NO and TO during high regulation are selected (Step 246). NO in Step 244 is greater than NO in Step 242, NO in Step 242 is greater than NO in Step 246. Because the greater NO is, the later the regulation is carried out, i.e., low regulation is carried out. TO in Step 244 is shorter than TO in Step 242, TO in Step 242 is shorter than TO in Step 246. Because the shorter TO is, the earlier the reset of N in Step 260 is performed, i.e., low regulation is carried out. Thereafter, in an engine control main routine, a fuel injection flow rate and an ignition timing are determined (Step 248).

Subsequently, necessity of the lag angle control is judged (Step 250) when there is no necessity, the routine proceeds to Step 276. When there is necessity, time value T1 and preset value TO are compared with each other (Step 252). Here, time value T1 is a measure of a period of time after completion of the lag angle control. When T1> TO, counter N is reset (Step 260). When T1≦ TO, count N is incremented (Step 254). Subsequently, count N is compared with said value NO, and, when N< NO, flag F is reset (Step 262). When N≧ NO, flag F is set (Step 258). In Step 264, flag F is judged, and, when F=0, i.e. it is normal time, the lag angle control is carried out in accordance with the lag angle control routine (Step 266), and timer T1 is started (Step 268). When F=1, i.e. the lag angle controls are fequently carried out, a lag angle control regulation signal is outputted (Step 270), the lag angle control is regulated (Step 272) and timer T2 is started (Step 274). In Step 276, timer T2 is compared with predetermined value TO1, and, when T2< TO1, the routine returns to Step 234. When T2≧ TO1, the lag angle control regulation signal is stopped (Step 278), and flag F and timer T2 are reset (Step 280).

FIG. 5 is the example of the routine of calculating mean vehicle speed VA, mean engine rotary speed NeA and mean throttle opening AsA as used in FIG. 4. Here, a timer interruption is used, and an interrupt into this routine each predetermined time T3 is requested (Step 382). When the interrupt is applied, counter N1 is incremented, vehicle speed V, engine rotary speed Ne and throttle opening As are read in, respectively, (Step 386), and these values are integrated (Step 388). Subsequently, N1 and predetermined value NO1 are compared with each other (Step 390), and when N1< NO1, nothing is done. When N1≧ NO1, mean vehicle speed VA, mean engine rotary speed NeA and mean throttle opening AsA are calculated (Step 392), and counter N1, V, Ne and As are reset (Step 394).

Figure 6:
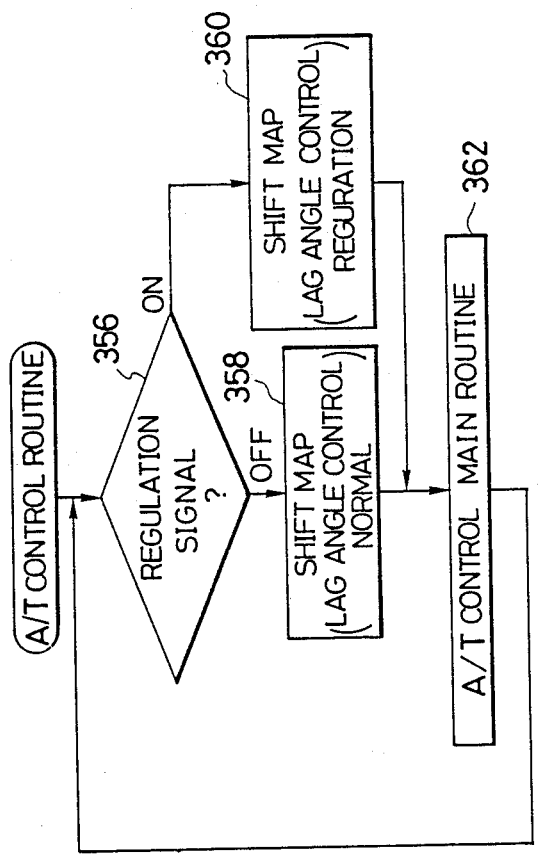
FIG. 6 is a flow chart showing an automatic transmission control rountine.

FIG. 6 is the flow chart showing the automatic transmission control routine. The presence of the lag angle control regulation signal is judged in Step 356, and, when the regulation signal is OFF, a shift point during the lag angle control (normal time) is selected (Step 358). When the regulation signal is ON, a shift point during the lag angle control prohibition is selected (Step 360). Thereafter, in the automatic transmission control main routine, a gear stage is determined in proportion to a vehicle speed and a throttle opening on the basis of the selected shift point (Step 362).

Additionally, the shift point during the lag angle control regulation is set lower as compared with the shift point while the lag angle control is carried out as shown in FIGS. 7(A) and 7(B) by an automatic control computer. When the shift point is set lower, the heat load of the frictionally engaging devices during shifting is decreased, so that the shift time duration can be shortened and the durability of the frictionally engaging devices can be improved, accordingly. As a result, even if the torque change control of the engine is regulated, the automatic transmission can carry out the shifting without causing a trouble.

According to the embodiment, when the engine torque controls (lag angle controls) of the predetermined number of times NO are carried out in the predetermined period of time TO, the subsequent lag angle control is regulated for the predetermined period of time TO1, so that rise in temperature of an exhaust pipe, a catalyst converter and the like due to increasing afterburn can be held within a threshold limit value and the durability of these members can be secured.

In this case, predetermined period time TO and predetermined number of times NO are changed in accordance with the warmed-up state of the engine, the vehicle speed, the engine rotary speed and the throttle opening, so that necessary and sufficient regulation can be carried out. More specifically, when the engine is not warmed up, it is considered that an increase of temperature in the exhaust system does not matter so much, so that regulation of torque change is made low (normal lag angle control may be carried out, with the regulation being set at zero). Furthermore, it is considered that, when the vehicle speed, the engine rotary speed and the throttle opening are high, the increase of temperature in the exhaust system is accordingly intense, so that the degrees of regulation can be changed to raise the regulation of torque change.

Further, when the lag angle control is regulated on the engine as described above, a lower shift point is selected on the automatic transmission during this period of time, so that, even if the lag angle control is regulated in the shifting generated during this period of time, the durability of the frictionally engagning devices can be secured, and worsened shift feeling due to prolonged shift time duration can be avoided.

What is claimed is:

1. A system for integrally controlling an automatic transmission and an engine, wherein gear stages are automatically switched in accordance with a preset shift map, and engine torque is changed by a predetermined value by a lag angle control, to maintain satisfactory shift characteristics, comprising:

processor means for controlling engine torque change, said processor means including means for detecting a high frequency of shiftings;

regulating means for regulating said change of engine torque when said high frequency of shiftings is detected;

means for detecting a warmed-up state of said engine; and modulating means for moderating regulation of the change of engine torque performed by said regulating means when the engine is not warmed-up.

2. The system as set forth in claim 1,
wherein said means for detecting the warmed-up state of the engine includes means for detecting whether engine cooling water temperature is higher than a predetermined value of temperature.

3. The system as set forth in claim 1,
wherein said means for detecting the high frequency of shiftings includes means for detecting whether the number of shifting times in a preset period of time is greater than a preset value.

4. The system as set forth in claim 1, further comprising,
means for detecting a vehicle speed,
wherein moderation of regulation performed by said moderating means is carried out in accordance with the vehicle speed, in addition to the warmed-up state of the engine.

5. The system as set forth in claim 1, further comprising,
means for detecting an engine rotary speed,
wherein moderation of regulation performed by said moderating means is carried out in accordance with the engine rotary speed, in addition to the warmed-up state of the engine.

6. The system as set forth in claim 1, further comprising,
means for detecting an engine load,
wherein moderation of regulation performed by said moderating means is carried out in accordance with the engine load, in addition to the warmed-up state of the engine.

7. The system as set forth in claim 1, further comprising:
means for detecting a vehicle speed; and
means for detecting an engine rotary speed,
wherein moderation of regulation performed by said moderating means is carried out in accordance with the vehicle speed and the engine rotary speed, in addition to the warmed-up state of the engine.

8. The system as set forth in claim 1, further comprising:
means for detecting a vehicle speed; and
means for detecting an engine load,
wherein moderation of regulation performed by said moderating means is carried out in accordance with the vehicle speed and the engine load, in addition to the warmed-up state of the engine.

9. The system as set forth in claim 1, further comprising:
means for detecting an engine rotary speed; and
means for detecting an engine load,
wherein moderation of regulation performed by said moderating means is carried out in accordance with the engine rotary speed and the engine load, in addition to the warmed-up state of the engine.

10. The system as set forth in claim 1, further comprising:
means for detecting a vehicle speed;
means for detecting an engine rotary speed; and
means for detecting an engine load,
wherein moderation of regulation performed by said moderating means is carried out in accordance with the vehicle speed, the engine rotary speed and the engine load, in addition to the warmed-up state of the engine.

11. The system as set forth in claim 1, further comprising,
means for changing said shift map,
wherein said shift map is changed to a shift map where shift points are set lower, when said regulation of the change of engine torque is carried out.

12. The system as set forth in claim 1, further comprising,
means for issuing a warning when said regulation of the change of engine torque is carried out.

* * * * *